US009491282B1

(12) United States Patent
Purkayastha et al.

(10) Patent No.: US 9,491,282 B1
(45) Date of Patent: Nov. 8, 2016

(54) END-TO-END CALL TRACING

(71) Applicant: Cisco Technology, Inc., San Jose, CA (US)

(72) Inventors: Monimoy Deb Purkayastha, Bangalore (IN); Ashish Mishra, Bangalore (IN); Narender Singh Pal, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/736,598

(22) Filed: Jun. 11, 2015

(30) Foreign Application Priority Data

May 13, 2015 (IN) .......................... 1887/MUM/2015

(51) Int. Cl.
*H04M 1/24* (2006.01)
*H04M 3/08* (2006.01)
*H04M 3/22* (2006.01)
*H04M 3/51* (2006.01)
*G06N 7/00* (2006.01)

(52) U.S. Cl.
CPC ............. *H04M 3/2281* (2013.01); *G06N 7/00* (2013.01); *H04M 3/5175* (2013.01); *H04M 3/5191* (2013.01)

(58) Field of Classification Search
CPC ................. H04L 3/16; H04L 12/2602; H04L 29/06027; H04L 41/046; H04L 41/0681; H04L 43/00; H04L 43/12; H04L 65/1006; H04L 65/1009; H04L 65/103; H04L 65/104; H04L 65/1076; H04M 3/2281; H04M 3/36; H04M 15/00; H04M 15/41; H04M 15/55; H04W 4/22; H04W 27/08; H04W 79/007

USPC .................. 379/1.01, 9.02, 9.03, 9.04, 32.01, 379/32.05, 207.06, 207.08, 207.15, 221.03, 379/221.05, 14.01, 10.02, 12, 15.05, 22, 379/27.01; 370/241, 242, 248, 252, 351, 370/352

See application file for complete search history.

(56) References Cited

U.S. PATENT DOCUMENTS

| 5,659,604 | A  | * | 8/1997  | Beckmann ......... H04M 3/2281 |
|           |    |   |         |                     379/112.01 |
| 6,333,931 | B1 |   | 12/2001 | LaPier et al.                  |
| 6,763,103 | B1 | * | 7/2004  | Willrett ............. H04M 3/2254 |
|           |    |   |         |                     379/221.08 |
| 7,142,534 | B1 |   | 11/2006 | Whent et al.                   |
| 7,206,385 | B2 |   | 4/2007  | Ethier et al.                  |
| 7,209,548 | B2 |   | 4/2007  | Ethier et al.                  |

(Continued)

OTHER PUBLICATIONS

Riverbed, "Riverbed SteelCentral," Product Family Brochure, retrieved from http://www.riverbed.com/about/document-repository/SpecSheet-SteelheadProductFamily.html, May 2015, 8 pages.

(Continued)

*Primary Examiner* — Binh Tieu
(74) *Attorney, Agent, or Firm* — Edell, Shapiro & Finnan, LLC

(57) ABSTRACT

Local call information data sets are obtained for each of a plurality of devices engaged in a call, the local call information data sets comprising call attributes and associated metadata. Call signaling is mapped by correlating at least one attribute pertaining to the call in each of the local call information data sets. Global end-to-end call state machine is generated subsequent to mapping of call signaling. The global end-to-end call state machine includes a plurality of global states. Each global state represents a local state of each device along with state transition indicating change in the local state of at least one device.

20 Claims, 8 Drawing Sheets

(56) References Cited

U.S. PATENT DOCUMENTS

| | | | |
|---|---|---|---|
| 7,283,619 B2 | 10/2007 | Ethier et al. | |
| RE40,148 E * | 3/2008 | Burns | H04Q 11/0478 |
| | | | 370/216 |
| 7,564,953 B2 | 7/2009 | Ethier et al. | |
| 7,710,900 B2 | 5/2010 | Andrews et al. | |
| 7,778,393 B2 | 8/2010 | Ethier et al. | |
| 7,822,850 B1 | 10/2010 | Brikman et al. | |
| 8,576,991 B2 * | 11/2013 | Geldenbott | H04M 3/36 |
| | | | 370/352 |
| 8,649,498 B1 | 2/2014 | Rankin et al. | |
| 2003/0123481 A1 * | 7/2003 | Neale | H04B 7/18582 |
| | | | 370/466 |
| 2005/0094623 A1 * | 5/2005 | D'Eletto | H04L 29/06027 |
| | | | 370/352 |
| 2007/0280123 A1 * | 12/2007 | Atkins | H04L 41/142 |
| | | | 370/252 |
| 2008/0004035 A1 * | 1/2008 | Atkins | H04L 41/142 |
| | | | 455/454 |
| 2008/0179647 A1 * | 7/2008 | Seo | H01L 27/10814 |
| | | | 257/296 |
| 2008/0181368 A1 * | 7/2008 | O'Sullivan | H04L 41/046 |
| | | | 379/1.01 |
| 2012/0328083 A1 * | 12/2012 | Kung | H04L 43/16 |
| | | | 379/32.01 |
| 2013/0265881 A1 * | 10/2013 | Filsfils | H04L 43/0805 |
| | | | 370/241 |
| 2014/0080478 A1 * | 3/2014 | Costelloe | H04W 8/24 |
| | | | 455/423 |

OTHER PUBLICATIONS

Cisco, "Chapter 5: Monitoring Predefined Cisco Unified Communications Manager Objects," Cisco Unified Real-Time Monitoring Tool Administration Guide, OL-22519-01, Jul. 2010, 30 pages.

Elliott, "SIP Scenario Generator White Paper," Revision: v2.0, retrieved from ftp.unpad.ac.id/orari/library/library-sw.../sip/sipscenario/SipScenario.pdf, on Jun. 8, 2015, 5 pages.

Translatorx, Screenshots, retrieved from http://translatorx.org/screenshots.html, on Jun. 8, 2015, 5 pages.

* cited by examiner

END-TO-END CALL TRACING

PRIORITY CLAIM

This application claims priority to Indian Patent Application No. 1887/MUM/2015, filed May 13, 2015, the entirety of which is incorporated herein by reference.

TECHNICAL FIELD

The present disclosure relates to call tracing.

BACKGROUND

A significant percentage of call communications between two or more users end in a call failure. There exist numerous intermediate devices between the source and destination devices. Whenever a call failure takes place, troubleshooters/engineers have to first collect logs/data from every device, including all of the source, intermediate and destination devices. If need arises, the troubleshooter may physically check the problem device to rectify the issue that resulted in the call failure. As different teams may be responsible for different devices, coordination across the teams to locate and resolve issues may present challenges.

In typical signaling subsystems, message exchanges traverse between different components/devices. For example, in Contact Center deployments, messages traverse from a Gateway to a Customer Voice Portal to a Call Manager and further up to the call center agents. As a result, troubleshooting a failed call requires an evaluation of this entire chain of message exchanges.

DESCRIPTION OF EXAMPLE EMBODIMENTS

Overview

Figure 1:
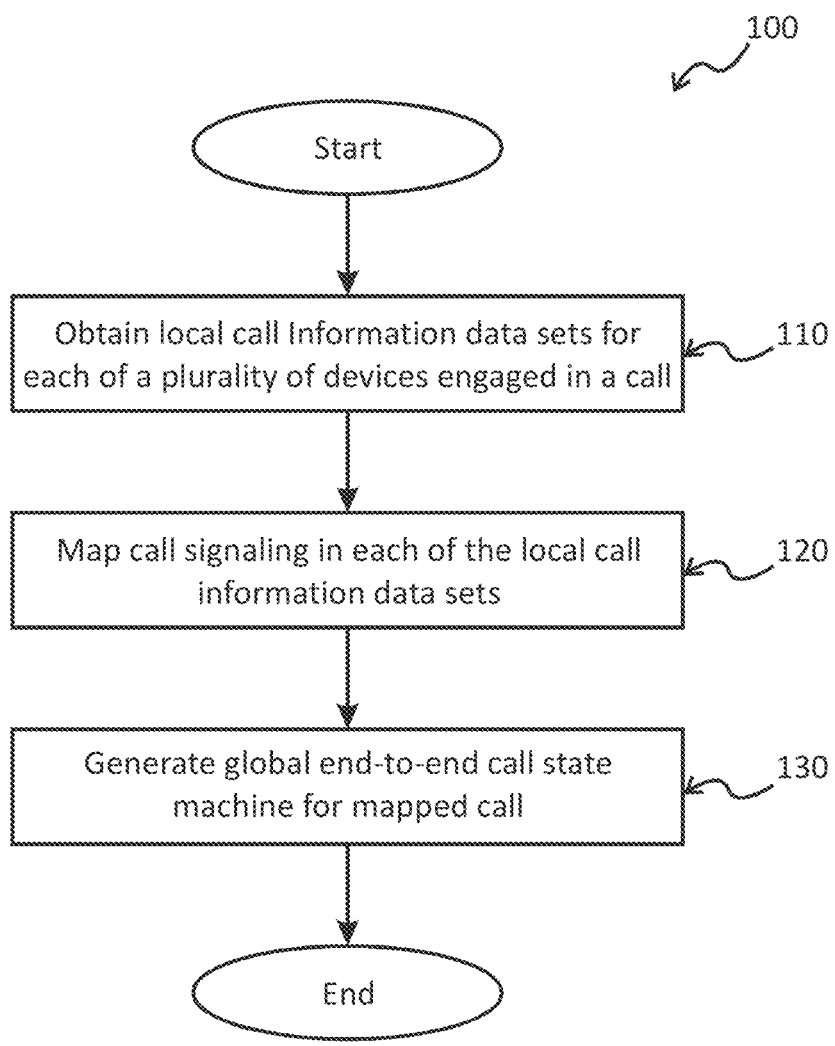
FIG. 1 is a high-level flowchart illustrating a process for performing end-to-end call tracing, according to an example embodiment.

Local call information data sets are obtained for each of a plurality of devices engaged in a call, the local call information data sets comprising call attributes and associated metadata. Call signaling is mapped by correlating at least one attribute pertaining to the call in each of the local call information data sets. Global end-to-end call state machine is generated subsequent to mapping of call signaling. The global end-to-end call state machine includes a plurality of global states. Each global state represents a local state of each device along with state transition indicating change in the local state of at least one device.

Example Embodiments

This description provides examples not intended to limit the scope of the appended claims. The figures generally indicate the features of the examples, where it is understood and appreciated that like reference numerals are used to refer to like elements.

Before describing in detail aspects that are in accordance with the embodiments presented herein, it should be observed that the aspects reside primarily in combinations of method steps and apparatus involved in end-to-end call tracing.

With reference to FIG. 1, depicted therein is a flowchart 100 illustrating an end-to-end call tracing method. The method of flowchart 100 may be applied to an environment like that which will be described below with reference to FIG. 3. The method of FIG. 1 may be utilized to determine which of a number of network messages sent from a plurality of network devices belong to, for example, a single call. Specifically, as will be described below with reference to flowchart 100, correlations are found between attributes and/or metadata within messages sent between different devices. Based on these correlations, it may be determined which of the messages belong to a single call. Once it is determined which messages belong to a single call, call signaling may be mapped, and global end-to-end call state machine may be generated for the call. This global end-to-end call state machine may then be used to visualize the call through, for example, a ladder diagram and/or a state transition diagram, examples of which will be described below with reference to FIGS. 5-8. The ladder diagram and/or state transition diagram may be used to determine when a message forming part of the call was lost, when a call connection was broken, and/or determine the time and cause of other issues during a call. Also, the ladder diagram/or state transition diagram may be used even in the scenario of call success.

At 110 of flowchart 100, a local call information dataset is obtained from each of a plurality of devices engaged in a call. The local call information data sets include lists of call attributes and/or associated metadata. At 120, call signaling is mapped by correlating at least one attribute pertaining to the call, in each of the local call information data sets. The mapping may include identifying which attribute and/or associated metadata belongs to the call, and then further mapping the call signaling based on the identification. For example, as will be described in greater detail below, the correlation of at least one attribute pertaining to the call in each of the local call information data sets may include finding a call attribute within a data set from a first device that matches an attribute within a data set from a second device. This correlation allows a determination to be made that the first device and second device are participating in the same call. Similarly, a call attribute within a data set from a third device may be correlated with an attribute within a data set from the second device and/or the first device, thereby determining that the third device is also participating in the call.

At 130, global end-to-end call state machine is generated subsequent to mapping of call signaling. Specifically, the global end-to-end call state machine is generated by retrieving complete set of local states of each device along the end-to-end call path, including their state transitions. In other words, the global end-to-end call state machine comprises of a plurality of global states, each global state representing a local state of each device along with state transition indicating change in local state of at least one device.

The global end-to-end call state machine represents a communication between the plurality of devices. The global end-to-end call state machine may be used to determine the end-to-end state of the call, such as if and when the call may have experienced technical difficulties and/or a break in communication. Furthermore, because the end-to-end call state machine has been generated based upon attributes and/or metadata correlated between a plurality of devices participating in the call, the end-to-end call state machine may provide the call state information for each leg of the call, i.e., the call state experienced by each of the plurality of devices participating in the call. The global end-to-end call state machine is represented by ladder diagram and/or state transition diagram as illustrated in FIGS. 5-8 (and described in greater detail below).

Figure 2A:
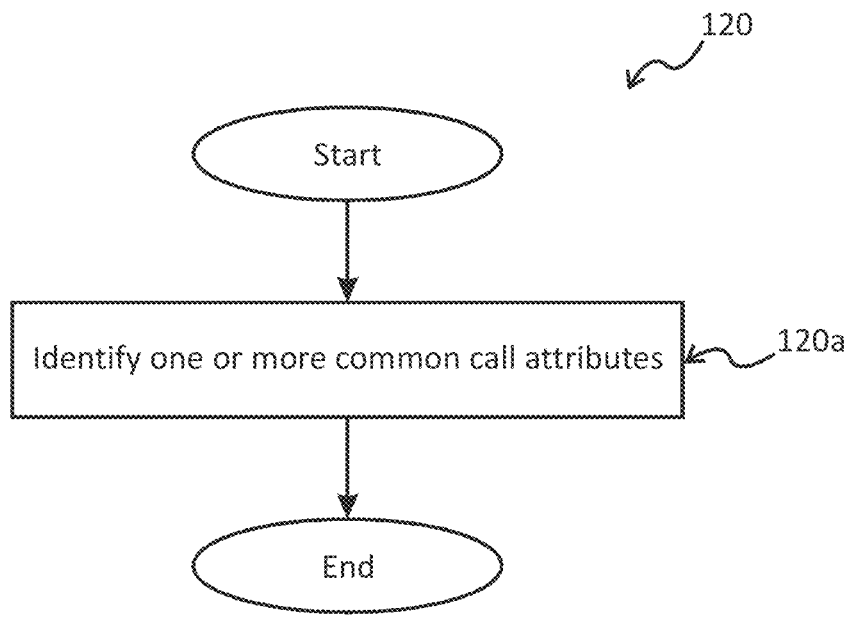
FIGS. 2*a-e* illustrate various processes for performing call signal mapping, according to example embodiments.
Figure 2B:
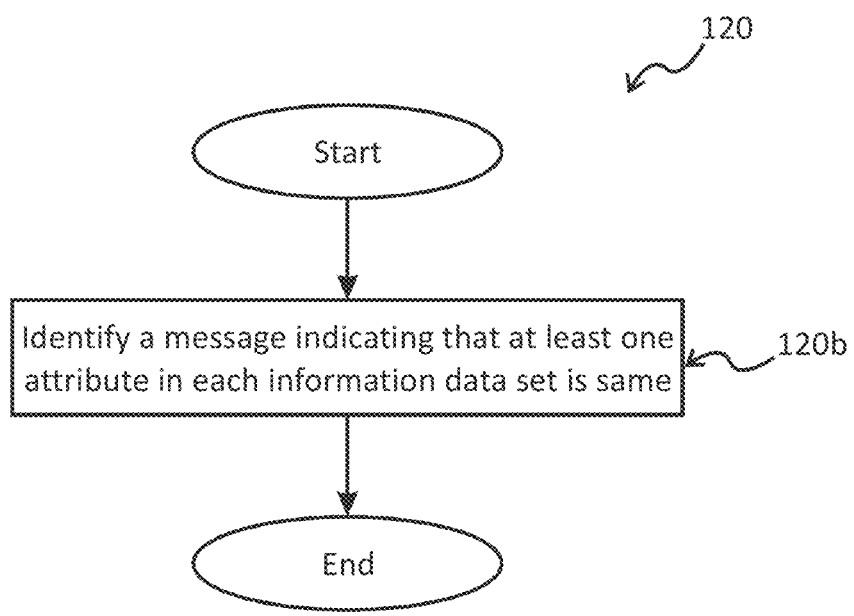
Figure 2C:
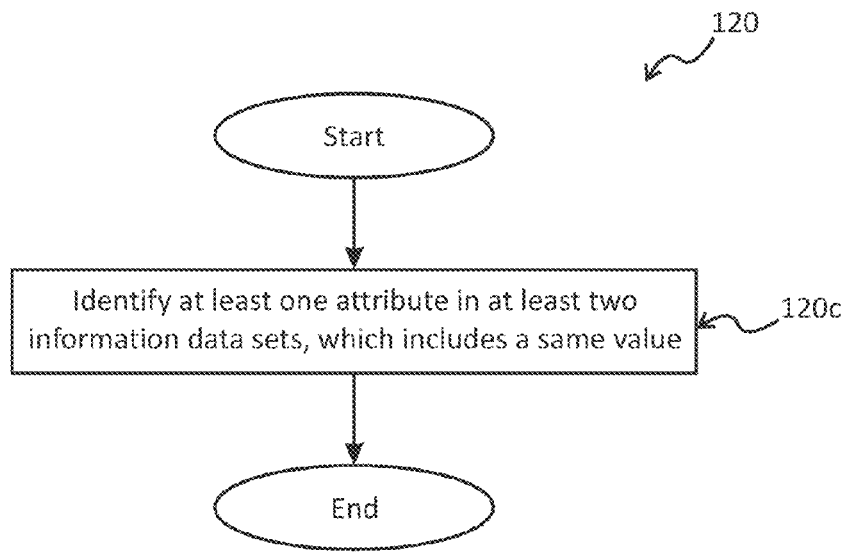
Figure 2D:
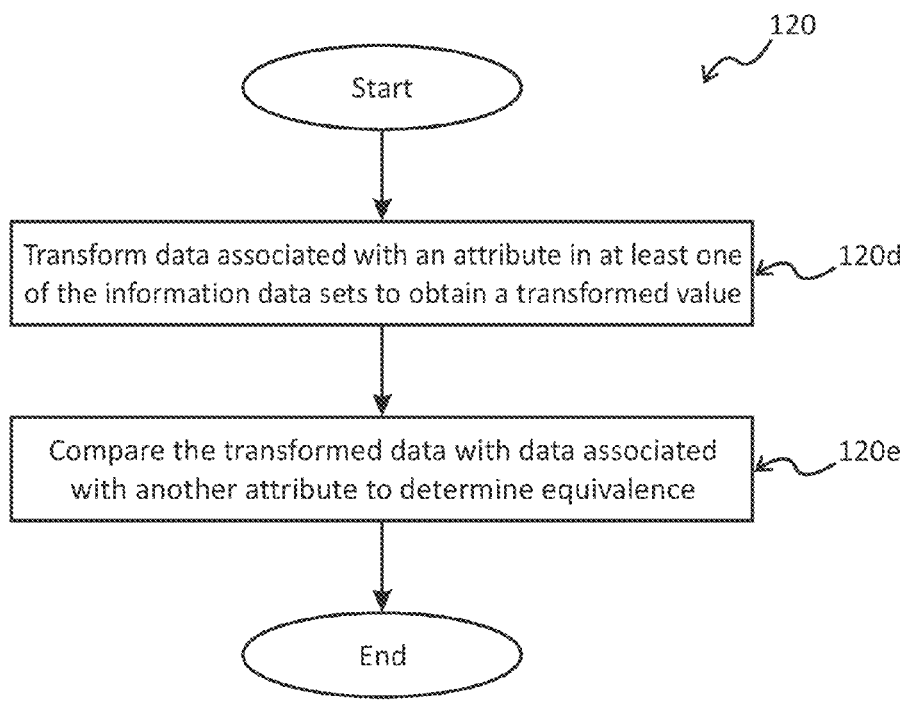
Figure 2E:
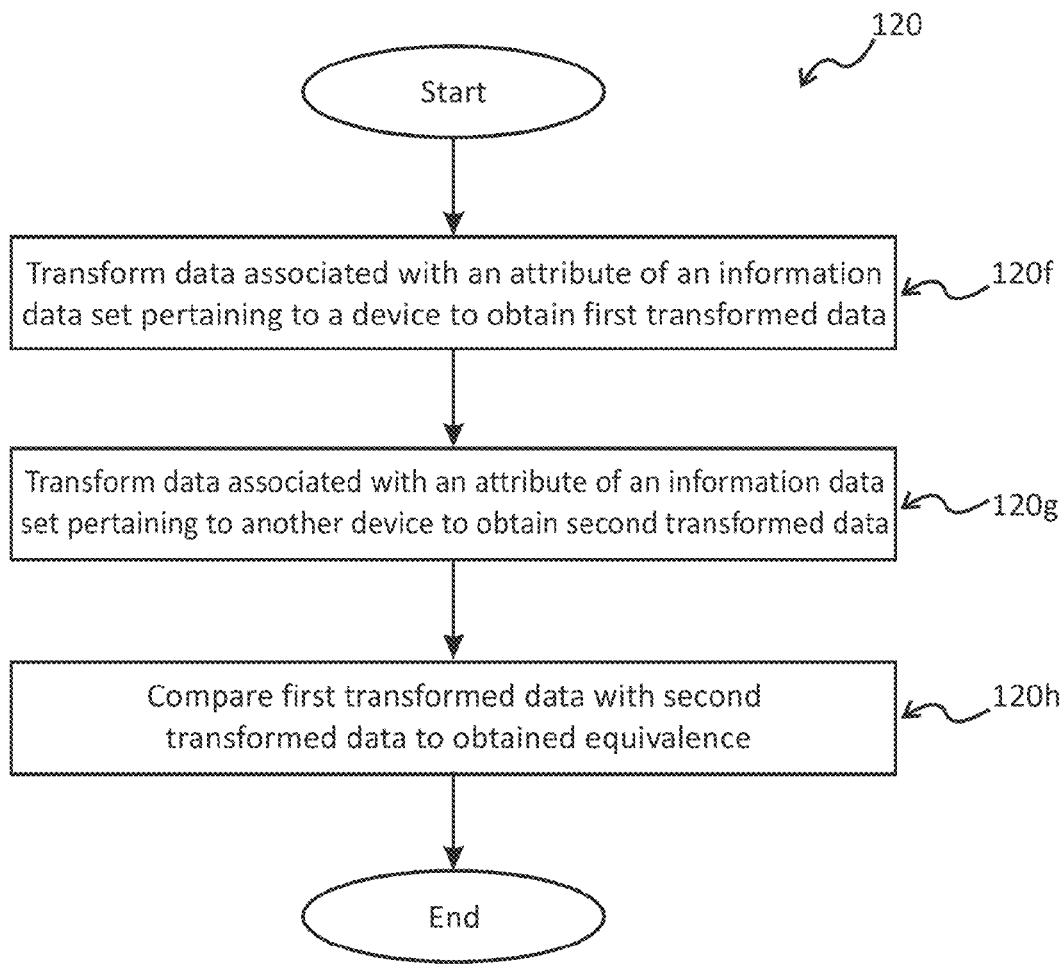

Reference is now made to FIGS. 2a-2e to describe examples of the mapping operation 120 of FIG. 1. Call signaling mapping operation 120 of FIG. 1 may be performed based on one or more of the following example mapping operations: identifying one or more call attributes common to at least two of the local call information data sets, as shown at 120a in FIG. 2a; identifying, using the metadata, a message indicating that at least one attribute in each information data set is the same, as shown in FIG. 2b; identifying at least one attribute in at least two information data sets, which includes a same value, as shown at 120c in FIG. 2c; transforming data associated with an attribute in at least one of the local call information data sets to obtain transformed data as shown at 120d and comparing the transformed data with data associated with another attribute to determine equivalence at 120e as shown in FIG. 2d; and/or transforming data associated with an attribute of an information data set pertaining to a first device to obtain first transformed data at 120f; transforming data associated with an attribute of an information data set pertaining to a second device to obtain second transformed data at 120g, and comparing first transformed data with second transformed data to determine equivalence at 120h as shown in FIG. 2e.

Figure 3:
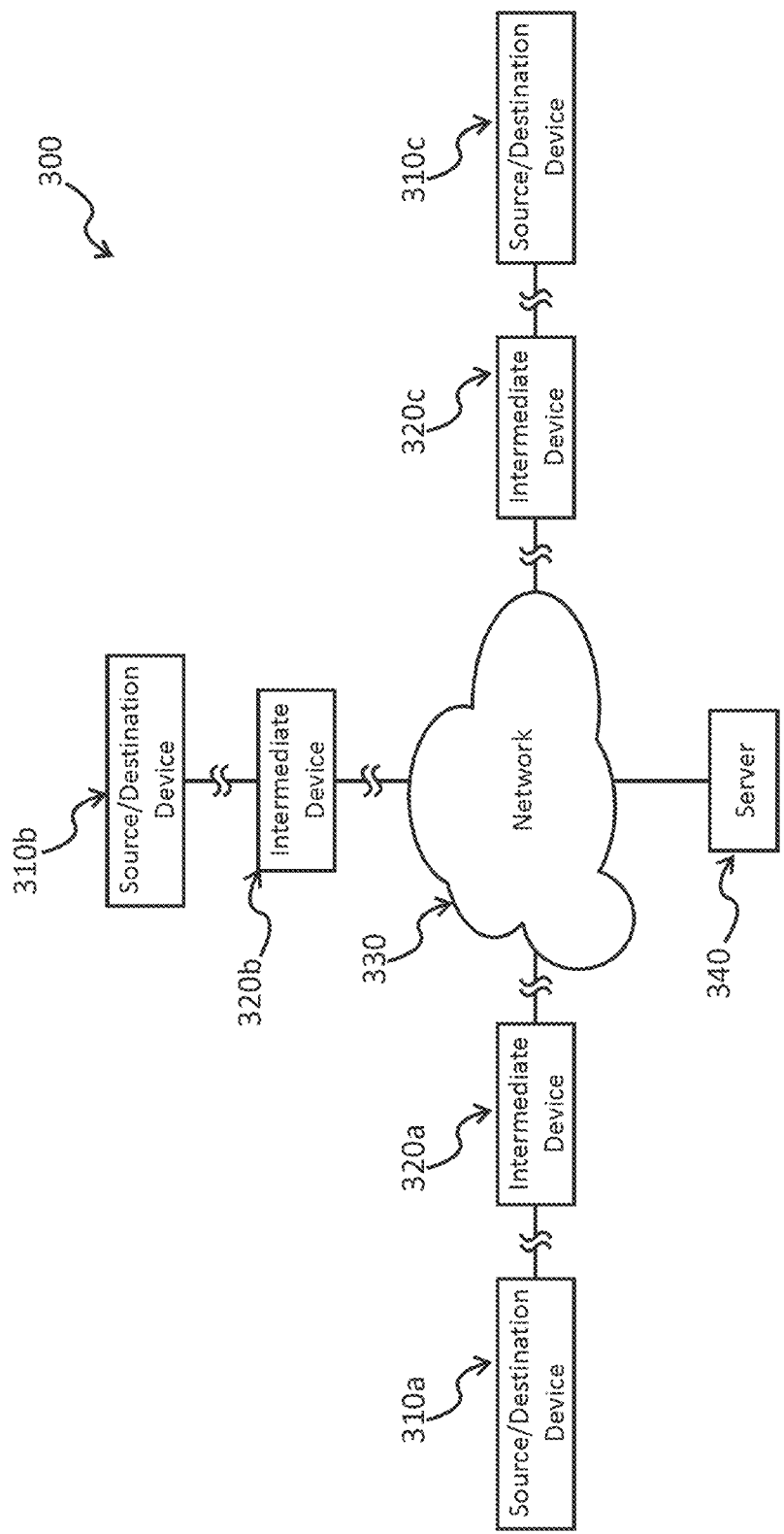
FIG. 3 is a block diagram of a network environment configured to perform end-to-end call tracing, according to an example embodiment.

FIG. 3 illustrates a network system 300 according to an example embodiment. Network system 300 may include a plurality of devices 310a-c, and 320a-c engaged in a call via a network 330. System 300 may also include a server/computing device 340 for performing end-to-end call tracing among the plurality of devices 310a-c, and 320a-c.

System 300 may be applicable to various voice and/or video-conferencing deployments, including but not limited to call-center deployments, unified communications deployments, telepresence deployments, Web Real Time Communication (WebRTC) deployments, instant messaging deployments, and any other system or subsystem involving call-signaling message exchanges.

System 300 may be applicable to and support various industry wide call signaling protocols including but not limited to Session Initiated Protocol (SIP), Signaling Connection Control Part (SCCP) protocol, International Telegraph Union (ITU) Telecommunications Standardization Sector recommendation H323, Extensible Message and Presence Protocol (XMPP), and secure Hyper Text Transfer Protocols (HTTP) such as HTTP over Transport Layer Security (HTTP over TLS), HTTP over Secure Socket Layers (HTTP over SSL) and HTTP Secure (HTTPS).

The plurality of devices may include endpoint devices such as source/destination devices 310a-c, as well as intermediate devices 320a-c. For the purpose of illustration only, the source and destination endpoints have been shown as combined source/destination devices 310a-c. However, source/destination devices 310a-c need not serve as both a source and a destination for a particular call.

Source/destination devices 310a-c may include any digital or other device capable of sending, receiving or joining calls, and include without limitation, Public Switched Telephone Network (PSTN) devices, Local Area Network (LAN) devices, mobile telephones, smartphones, and other computing devices with call capabilities. Call-capable devices may include desktop and laptop computers, personal digital assistants (PDAs), and converged devices incorporating the functionality of one or more of these classes of devices.

Intermediate devices 320a-c are generally used for bridging calls between source/destination devices 310a-c. Precisely, intermediate devices 320a-c assist in forwarding, routing, and regenerating calls between source/destination devices 310a-c. Intermediate devices 320a-c have capabilities including but not limited to gateway capabilities, user-agent capabilities, proxy capabilities, back-to-back user agent (B2BUA) capabilities, forwarder capabilities, firewalls capabilities, call-controller capabilities, router capabilities, switch capabilities, interactive voice response (IVR) capabilities, and others. Intermediate devices 320a-c may also include devices which participate in call processing, call control, and call-signaling.

The server/computing device 340 may represent an integrated multi-processor. Server/computing device 340 may comprise one or more physical machines/circuitry/means/modules which are communicatively connected to one or more source, intermediate and destination devices. The server/computing device 340 may include a system bus for communicating information, memory and one or more processors coupled to the bus for processing information. The memory may also comprise a mass storage with one or more magnetic disk drives, tape drives or optical disk drives, for storing data and instructions for use by one or more processors. Server 340 may be configured to carry out the end-to-end call tracing procedures described herein. The structure and operation of an example server/computing device will be described in greater detail with reference to FIG. 4.

Figure 4:
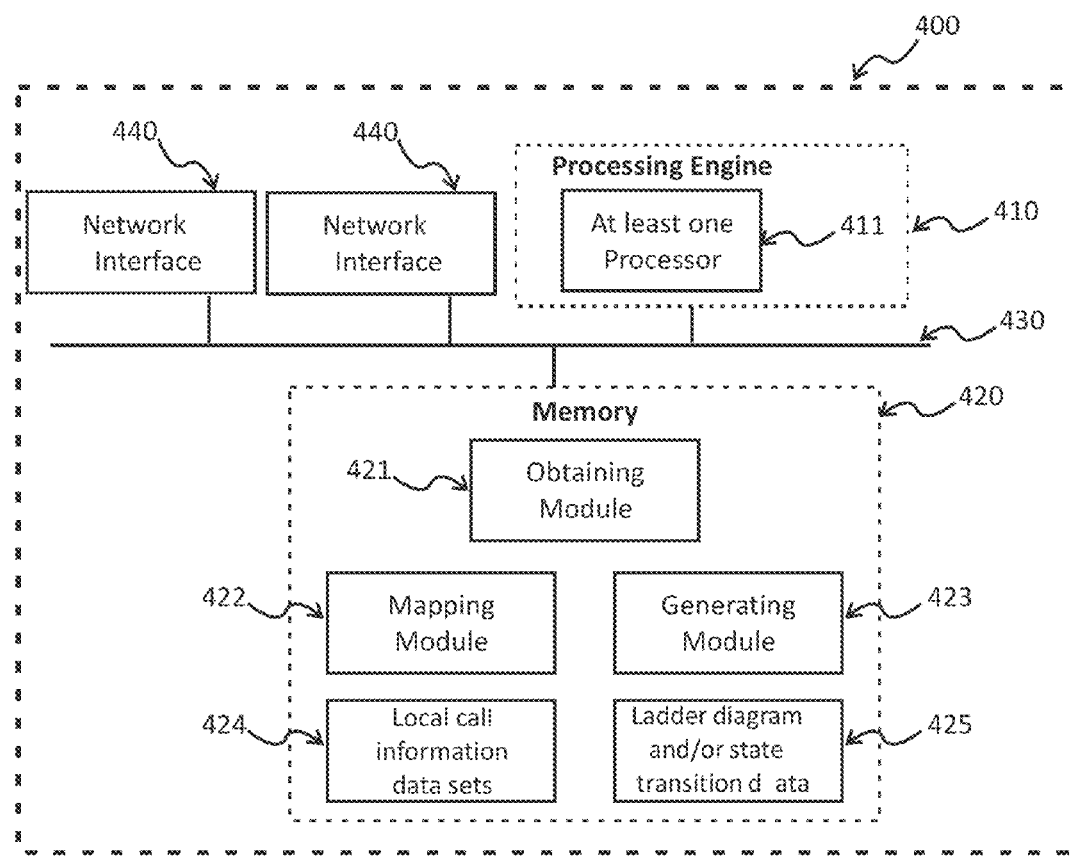
FIG. 4 is a block diagram of an apparatus configured to perform end-to-end call tracing, according to an example embodiment.

Turning to FIG. 4, depicted therein is a block diagram of an example apparatus 400, which may serve as the server/computing device 340 in FIG. 3. Specifically, apparatus 400 may be configured to perform end-to-end call tracing. The apparatus 400 may comprise a processing engine 410 coupled to a memory 420. The processing engine 410 may include one or more processors 411 for carrying out the operations of the processing engine 410. Memory 420 may include obtaining module 421, mapping module 422 and generating module 423. Each of the modules may include instructions to be executed by the one or more processors 411 for carrying out end-to-end call tracing.

The at least one processor 411 may execute the instructions contained in the obtaining module 421 for obtaining/collecting local call information data sets 424 from the plurality of devices, e.g., source/destination devices 310a-c and/or intermediate devices 320a-c of FIG. 3, engaged in a call. The obtained local call information data sets 424 are stored in the memory 420 for further analysis/processing. The at least one processor 411 may execute the instructions contained in the mapping module 423 for mapping call signaling in each of the local call information data sets 424. Specifically, the at least one processor 411 maps call signaling by correlating at least one attribute pertaining to the call in each of the local call information data sets 424. The at least one processor 411 identifies call signaling in each of the information data sets 424 and stitches the identified call signaling across the information data sets 424. The at least one processor 411 may further execute the instructions contained in the generating module 423 for generating global end-to-end call state machine for the call, subsequent to mapping of call signaling. The generated global end-to-end call state machine may be represented by ladder diagram and/or state transition diagram.

Mapping module 422 may cause processor 411 to map call signaling by performing one or more of following steps: a) identifying one or more common call attributes and/or metadata, b) identifying a message using said attributes and/or metadata, wherein said message indicates that at least one attribute in each information data set is the same, c) identifying at least one attribute in any of the two information data sets that includes a same value, d) transforming data associated with an attribute in any of the information data sets to obtain transformed data, and comparing the transformed data with data associated with another attribute to determine equivalence, and/or e) transforming data associated with an attribute of an information data set pertaining to a device to obtain first transformed data, transforming data associated with an attribute of an information data set pertaining to another device to obtain second transformed data, and comparing first transformed data with second transformed data to determine equivalence.

Additionally, generating module 423 may further include instructions that cause the processor to locate and/or determine the cause of a call failure, error, or other call event. Specifically, once the end-to-end call state machine has been generated, this state machine can be used to determine errors or other events during the call, and also determine the cause of the event. For example, the end-to-end call state machine may indicate that one device has timed-out while waiting for a response from another device. Using the end-to-end call state machine, generating module 423 may be able to automatically determine the cause of the time out.

Apparatus 400 also includes system bus 430 and network interfaces 440. System bus 430 allows intercommunication between the processing engine 410, processors 411, memory 420, and network interfaces 440. Network interfaces 440 may be used to receive and send packets and/or messages over a network. Accordingly, network interfaces 440 may be embodied as wired interfaces, wireless interfaces, optical interfaces, electrical interfaces, or a combination thereof.

The following description is provided to illustrate the process 100 of FIG. 1, as carried out by a device such as device 400 of FIG. 4. Specifically, illustrated below are three local call information data sets obtained according to 110 of FIG. 1 by a device 400 as illustrated in FIG. 4. For example, the three local call information data sets may be received by processor 411 of device 400 of FIG. 4 via network interface 440 according to instructions stored in obtaining module 421. These three local call information data sets may be stored as data 424 in memory 420 at the direction of processor 411. The source of each of the three local call information data sets may be any three of source/destination devices 310*a*-*c* and/or intermediate devices 320*a*-*c* of FIG. 3. However, for the sake of simplicity, the specific source device is not referred to in describing the below example.

The first local call information data set includes the following data and metadata:

MM/DD/YYYY 17:55:37,callID=ABCDEFG,start,A New Call,name=Joe Blow,ani=2125551212,duration=1818

MM/DD/YYYY 18:19:01,call#=AAABBBCCC,start,A New Call,name=Jane Doe,ani=8005551212,duration=142

MM/DD/YYYY 18:45:34,call#=A1B2C3D4,start,A New Call,name=Jane Doe,ani=6466747777,duration=794

The second local call information data set includes the following data and metadata:

MM/DD/YYYY 17:50:15 0.112|callID=AAA|from=111-==-to=222 MSG=msgB1

MM/DD/YYYY 17:51:14.670|callID=AAA|from=111-==-to=A MSG=msgB2,product1Id=ABCDEFG MM/DD/YYYY 17:51:47.731|callID=AAA|from=111-==-to=333 MSG=msgB3

MM/DD/YYYY 17:53:50.755|callID=AAA|from=333-==to=111 MSG=msgB4

MM/DD/YYYY 17:53:50.755|MSG=msgB97 from=999-==-to=888

MM/DD/YYYY 17:58:14 0.472|callID=AAA|from=333-==to=222 MSG=msgB5

MM/DD/YYYY 18:04:01.580|callID=AAA|from=A-==to=333 MSG=msgB6

MM/DD/YYYY 18:04:27.719|callID=AAA|from=111-==to=222 MSG=msgB7

MM/DD/YYYY 17:51:47.530|callID=BBB|from=222-==to=222 MSG=msgB8

MM/DD/YYYY 17:51:54 0.650|callID=BBB|from=111-==to=222 MSG=msgB9

MM/DD/YYYY 17:52:27.761|callID=BBB|from=222-==to=111 MSG=msgB10,product1Id=AAABBBCCC More junk MM/DD/YYYY 17:52:30.725|callID=BBB|from=222-==to=333 MSG=msgB11

MM/DD/YYYY 17:53:50.755|MSG=msgB98 from=888-==-to=999

MM/DD/YYYY 17:58:34.412|callID=BBB|from=333-==to=222 MSG=msgB12

MM/DD/YYYY 17:59:51.530|callID=BBB|from=333-==to=111 MSG=msgB13

MM/DD/YYYY 17:59:51.530|even more junk

MM/DD/YYYY 17:59:57.779|callID=BBB|from=111-==to=222 MSG=msgB14

MM/DD/YYYY 17:51:47.530|callID=CCC|from=222-==to=B MSG=msgB15

MM/DD/YYYY 17:51:54.650|callID=CCC|from=111-==to=222 MSG=msgB16

MM/DD/YYYY 17:52:27.761|callID=CCC|from=222-==to=333 MSG=msgB17

MM/DD/YYYY 17:52:30.725|callID=CCC|from=111-==to=444 MSG=msgB18,product1Id=A1B2C3D4

MM/DD/YYYY 17:53:50.755|MSG=msgB99 from=999-==-to=888

MM/DD/YYYY 17:58:34.412|callID=CCC|from=B-==to=222 MSG=msgB19

MM/DD/YYYY 17:59:51.530|callID=CCC|from=111-==to=333 MSG=msgB20

MM/DD/YYYY 17:59:57.779|callID=CCC|from=111-==to=222 MSG=msgB21

The third local call information data set includes the following data and metadata:

MM/DD/YYYY 17:55:37.540,MSG=msgA1,SessionID=1111,from=A,to=B

MM/DD/YYYY 17:55:44.660,MSG=msgA2,SessionID=1111,from=A,to=C completely irrelevant data start hello there my name is Shmo Shmo completely irrelevant data end
MM/DD/YYYY 17:55:37.771,MSG=msgA3,SessionID=1111,from=C,to=B
MM/DD/YYYY 17:55:37.771,MSG=msgA3,SessionID=1111,from=C,to=B, topic=hello
MM/DD/YYYY 17:56:16.334,CONFIG UPDATE=assignmentQueue,data=updated
MM/DD/YYYY 17:59:10.735,MSG=msgA4,SessionID=1111,from=B,to=A, CallID=AAA
MM/DD/YYYY 18:05:34.462,MSG=msgA5,SessionID=1111,from=B,to=A
MM/DD/YYYY 18:05:34.465—also should be ignored
MM/DD/YYYY 18:05:34.462,MSG=msgA5,SessionID=1111,from=B,to=A, topic=goodbye, correlationID=ABC 123-222
MM/DD/YYYY 18:10:11.590,MSG=msgA6,SessionID=1111,from=A,to=B
MM/DD/YYYY 18:10:37.799,MSG=msgA7,SessionID=1111,from=C,to=A
MM/DD/YYYY 18:12:16.454,CONFIG UPDATE=resoulrce,data=deleted
MM/DD/YYYY 17:55:37.540,MSG=msgA8,SessionID=2222,from=B,to=A, CallID=CCC
MM/DD/YYYY 17:55:44.660,MSG=msgA9,SessionID=2222,from=A,to=C # This "comment" should be ignored as it does not match anything
MM/DD/YYYY 17:55:44.660,MSG=msgA9,SessionID=2222,from=A,to=C, correlationID=ABC 123-222
MM/DD/YYYY 17:55:37.771,MSG=msgA10,SessionID=2222,from=C,to=B
MM/DD/YYYY 17:59: 10.735,MSG=msgA11,SessionID=2222,from=B,to=A
MM/DD/YYYY 18:05:34.462,MSG=msgA12,SessionID=2222,from=A,to=B
MM/DD/YYYY 18:13:55.503,Data=yoyoyo, Description=ignore me
MM/DD/YYYY 18:10:11.590,MSG=msgA13,SessionID=2222,from=C,to=B
MM/DD/YYYY 17:59:59.246,CONFIG UPDATE=resource,data=added
MM/DD/YYYY 18:10:11.590,MSG=msgA13,SessionID=2222,from=C,to=B, correlationID=ABC 123-111
MM/DD/YYYY 18:10:37.799,MSG=msgA14,SessionID=2222,from=C,to=A # The line below should not match because the fields are out of order
MM/DD/YYYY 18:19:45.134,to=A,SessionID=2222, MSG=msgA15,from=C, Once obtained, the three local call information data sets may be stored in a memory, such as memory 420 of FIG. 4.

After receiving the information data sets from each of the three devices, call signaling may be mapped, e.g., such as by the mapping operation of 120 of FIG. 1, via a processor, such as processor 411 of FIG. 4 carrying out the instructions of mapping module 422 of FIG. 4. Specifically, the mapping of the three data sets will correlate at least one attribute and/or metadata pertaining to the call, in each of the three local call information data sets.

For example, the first local call information data set includes the following entry:
MM/DD/YYYY 17:55:37,CallID=ABCDEFG,start,A New Call, name=Joe Blow,ani=2125551212,duration=1818

This entry may be correlated with the following entry from the second local call information data set:
MM/DD/YYYY 17:51:14.670|CallID=AAA|from=111-==to=A MSG=msgB2,product1Id=ABCDEFG Specifically, the "CallID" attribute in the first local call information data set may be correlated with the "CallID" attribute in the second local call information data set. Specifically, the "product1Id's" metadata (i.e. ABCDEFG) in the second local call information data set, matches with the metadata of Call ID attribute, in the first local call information data set. More particularly, the second information data set contains a message which correlates that product1Id is same as CallID of the first information data set. As used herein, metadata refers to a data/value which provides information about an attribute. Not restricted to the attributes, the metadata may contain details of a call as well, for example, time of a call, date of a call, etc.

Furthermore, the third local call information data set may be correlated with the second local call information data set according to the following entry from the third local call information data set:
MM/DD/YYYY 17:59:10.735, MSG=msgA4, SessionID=1111, from=B,to=A, CallID=AAA Specifically, the "CallID" attribute in the second local call information data set may be correlated with the "SessionID" attribute in the third local call information data set. Specifically, the "CallID's" metadata (i.e. AAA) in the third local call information data set matches with the metadata of CallID attribute, in the second local call information data set. More particularly, the third information data set contains a message which correlates that CallID is same as CallID of the second information data set. These correlations are summarized as follows in Table 1:

TABLE 1

| Device | Attribute | Metadata | Correlation Attribute | Correlation Metadata |
|---|---|---|---|---|
| 1 | Call ID | ABCDEFG | — | — |
| 2 | Call ID | AAA | Product1ID | ABCDEFG |
| 3 | Session ID | 1111 | Call ID | AAA |

As illustrated in Table 1, the "CallID" attribute of the first information data set is correlated with "CallID" attribute of the second information data set. In other words, the metadata associated with callID attribute in the first local call information data set and the product1Id attribute in the second local call information data set match. Likewise, the "CallID" attribute of the second information data set is correlated with the "SessionID" attribute of the third information data set. These values are correlated because the metadata associated with CallID attribute of the third local call information data set and call ID attribute of the second local call information data set match, specifically, the "CallID" for both entries match. Hence, a chain is formed by linking the call signaling across the data sets of all the devices. This chain can be used to map the call information as relating to a single call, which can be used to generate an end-to-end mapping of the call.

Subsequent to mapping of the call signaling, global end to end call state machine may be generated in accordance with 130 of FIG. 1, and may be carried out via processor of FIG. 4 according to the instructions of generating module 423. The end-to-end call state machine may include an indication of a call success or a call failure. The generated end-to-end call state machine may be represented by ladder and/or state transition diagram that may be stored in memory 420 of FIG.

4. The ladder diagram and/or state transition diagram may be used by a user to determine features of a call, such as an indication of a call success or a call failure.

In the above example, only a few types of attributes are considered for illustrating the aspect of mapping. However, the attributes are not limited to the above example and may include but not limited to the following attributes: "event_seq"; "GUId"; "GlobalCallId"; "DateTimeOrigination"; "DateTimeAlert"; "DateTimeConnect"; "DateTimeDisconnect"; "CallSetupDelay"; "Duration"; "CallSecuredStatus"; "JoinOnBehalfOf"; "Comment"; "CurrentRoutingReason"; "Calling_TenantName"; "Calling_PartyNumber"; "Calling_PartyNumber_uri"; "Calling_PartyNumberPartition"; "Calling_PartyUnicodeLoginUserId"; "Calling_AudioBandwidth"; "Calling_AudioCodecSet"; "Calling_AudioTransportAddress"; "Calling_CallTerminationOnBehalfOf"; "Calling_Cause_location"; "Calling_Cause_value"; "Calling_SIP_cause_value"; "Calling_ConversationId"; "Calling_DeviceName"; "Calling_CallManagerDeviceType"; "Called_TenantName"; "Called_PartyNumber"; "Called_PartyNumber_uri"; "Called_PartyNumberPartition"; "Called_PartyPattern"; "Called_PartyPatternUsage"; "Called_PartyUnicodeLoginUserId"; "Called_AudioBandwidth"; "Called_AudioCodecSet".

Figure 5:
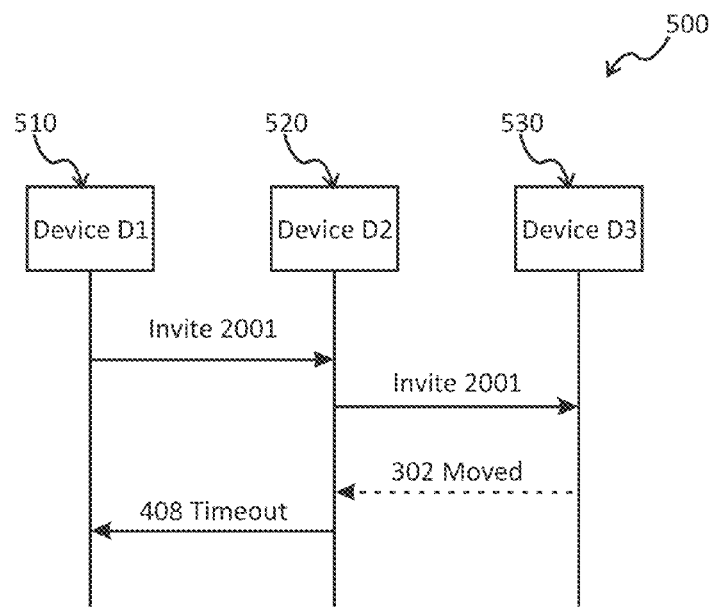
FIGS. 5 and 7 relate to ladder diagrams illustrating an end-to-end call trace, according to example embodiments.
Figure 6:
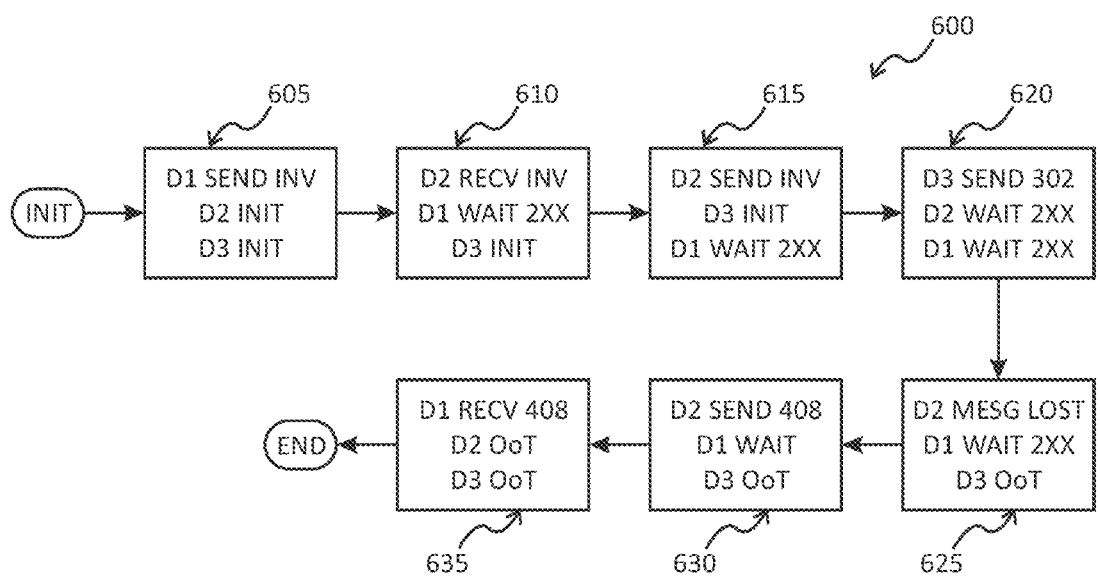
FIGS. 6 and 8 relate to state transition diagrams illustrating an end-to-end call trace, according to an example embodiment.

Reference is now made to FIGS. 5 and 6 which illustrate a ladder diagram 500 and a state transition diagram 600, respectively, of global end-to-end call state for a call failure scenario. Only for the sake of simplicity, three devices are shown as engaged in a call. However, this should not be considered as limiting the scope.

The ladder diagram 500 represents global end-to-end call state machine for a call traversing between device D1 510, device D2 520 and device D3 530 (hereinafter referred as D1, D2 and D3). The ladder diagram 500 illustrates a communication between D1-D3 510-530, wherein said communication comprises a plurality of message exchanges between D1-D3 510-530.

Also, the ladder diagram 500 serves numerous purposes for call tracing. As the call signaling has been mapped/ stitched, the ladder diagram 500 provides a global view of the call. Accordingly, the troubleshooter may immediately locate the problem by looking at the ladder diagram. For example, the troubleshooter may even trace lost messages in transition during a call (302 MOVED message).

The state transition diagram 600 comprises of a plurality of global states 605-635 for the call traversing end-to-end i.e. between D1 510, D2 520 and D3 530. In FIG. 6, each global state represents a local state of each device along with state transition indicating change in the local state of at least one device.

For example, the first global state 605 indicates D1 510 sends an INVITE 2001 message to D2 520. At 605, D2 and D3 are at initializing stage. In other words, the first global state 605 indicates local states of D1-D3 i.e. D1 SEND INV, D2 INT and D3 INT. Also, the first global state 605 indicates state transition indicating change in the local state of at least one device. For example, state of D1 changes from INIT to SEND INV. Before state 605, D1 was in INIT local state.

In second global state 610, D2 receives INVITE 2001 message from D1. At 610, D3 initializes and D1 waits. The second global state 610 indicates local states of each D1-D3 i.e. D2 RECV INV, D1 WAIT 2xx and D3 INT. Also, the second global state 610 shows state transition indicating change in the local state of at least one device. For example, state of D2 changes from INIT to RECV INV and state of D1 changes from SEND INV to WAIT 2xx.

In third global state 615, D2 sends INVITE 2001 message to D3. At 615, D3 initializes and D1 waits. The third global state 615 also indicates local states of D1-D3 i.e. D2 SEND INV, D1 WAIT 2xx and D3 INT. Also, the third global state 615 shows state transition indicating change in the local state of at least one device. For example, state of D2 changes from RECV INV to SEND INV.

In fourth global state 620, D3 sends 302 MOVED message to D2. At 620, D2 waits and D1 waits. The fourth global state 620 indicates local states D1-D3 i.e. D3 SEND 302, D1 WAIT 2xx and D2 WAIT 2xx. Also, the fourth global state 620 shows state transition indicating change in the local state of at least one device. For example, state of D2 changes from SEND INV to WAIT 2xx and state of D3 changes from INIT to SEND 302.

In fifth global state 625, a message is lost at D2. At 625, D1 waits and D3 is out of transaction (OoT). The fifth global state 625 also indicates local states of D1-D3 i.e. D2 MSG LOST, D1 WAIT 2xx and D3 OoT. Also, the fifth global state 625 shows state transition indicating change in the local state of at least one device. For example, state of D2 changes from WAIT 2xx to MSG LOST and state of D3 changes from SEND 302 to OoT.

The sixth global state 630 indicates D2 sends 408 TIMEOUT message to D1. At 630, D1 waits and D3 is OoT. The sixth global state 630 indicates local states D1-D3 i.e. D2 SEND 408, D1 WAIT 2xx and D3 OoT. Also, the sixth global state 630 shows state transition indicating change in the local state of at least one device. For example, state of D2 changes from MSG LOST to SEND 408.

The seventh global state 635 indicates D1 receives 408 TIMEOUT message from D2. At 635, both D2 and D3 are OoT. The seventh global state 635 indicates local states of D1-D3 i.e. D1 RECV 408, D2 OoT and D3 OoT. Also, the seventh global state 635 shows state transition indicating change in the local state of at least one device. For example, state of D2 changes from SEND 408 to OoT and state of D1 changes from WAIT 2xx to RECV 408.

From the above, it is clear that the state transition diagram 600 provides a global view of the call traversing end-to-end. Accordingly, the troubleshooter may immediately locate the problem by looking at the various global states of the end to end call state machine. For example, the troubleshooter looking at global state 625 may even trace that D2 has timed out and a message is lost at D2 (302 MOVED message) being lost. Also, FIGS. 5 and 6 show at least one message/ code indicative of call success, call failure, call connected, message lost, etc.

Figure 7:
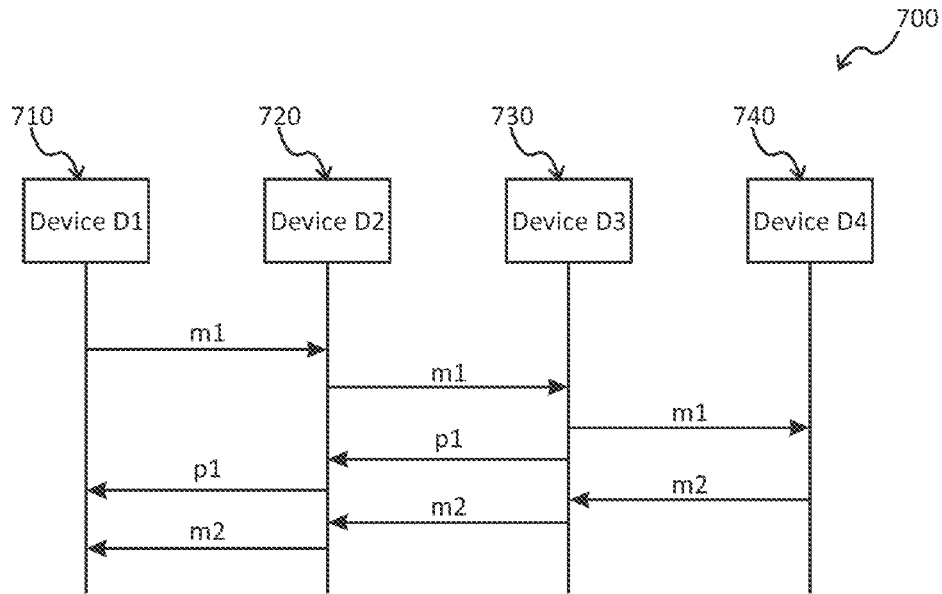
Figure 8:
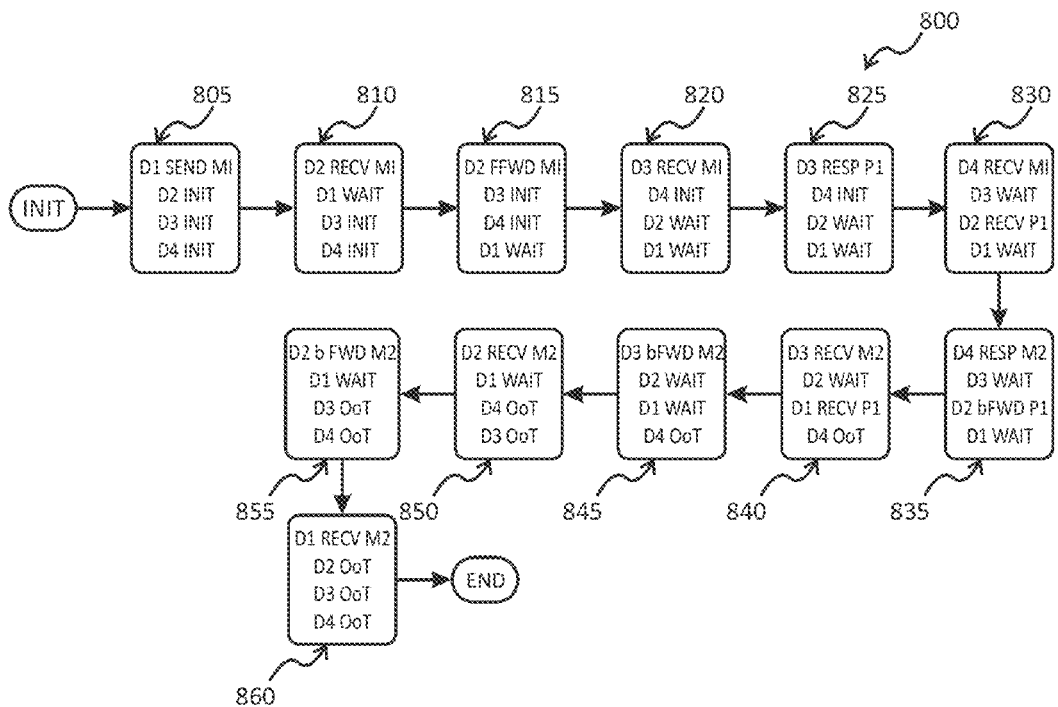

Reference is now made to FIGS. 7 and 8 which illustrate a ladder diagram 700 and a state transition diagram 800, respectively, providing global end-to-end state of a call in a call success scenario. Each global state 805-860 of the state transition diagram 800 indicates local states and state transition of all the devices 710-740 in said call success scenario. As we have already explained in detail the generation of global end to end call state machine, the same shall be applicable even to the process of call success.

The presentation of the configurations described herein is provided to enable any person skilled in the art to make or use the methods, and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein.

The various elements of an implementation of an apparatus as disclosed herein may be embodied in any hardware structure, or software or firmware or any combination of hardware with software and/or firmware, which is deemed suitable for the intended application. One or more elements of the various implementations of the apparatus disclosed herein may also be implemented in part as one or more sets of instructions arranged to execute on one or more fixed or programmable arrays of logic elements, such as microprocessors, embedded processors, IP cores, digital signal processors (DSPs), field-programmable gate arrays (FPGAs), application-specific standard products (ASSPs), and application-specific integrated circuits (ASICs).

A processor as disclosed herein may be fabricated as one or more electronic devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor as disclosed herein may also be embodied as one or more computers (e.g., machines including one or more arrays programmed to execute one or more sets or sequences of instructions) or other processors.

Those of skill will appreciate that the various illustrative modules, logical blocks, means, units and other operations described in connection with the configurations disclosed herein may be implemented as electronic hardware, computer software, or combinations of both. In hardware implementation, such modules, logical blocks, means, units and operations may be implemented as general purpose processors, DSPs, ASICs, ASSPs, FPGAs or other programmable logic devices, discrete gate or transistor logic, discrete hardware components, or any combination thereof designed to produce the configuration as disclosed herein.

For a software implementation, the techniques described herein may be implemented with modules (e.g., procedures, functions, and so on) that perform the functions described herein. The software codes may be stored in a memory and executed by a processor. The memory may be implemented within the processor or external to the processor, in which case it can be communicatively coupled to the processor via various means as is known in the art.

It is noted that the various methods disclosed herein may be performed by an array of logic elements such as a processor. Each of the tasks of the methods described herein may be embodied directly in hardware, in a software module executed by a processor, or in a combination of the two.

It is to be noted that non-transitory computer-readable medium may comprise a data storage medium such as RAM, such as synchronous dynamic random access memory (SDRAM), read-only memory (ROM), non-volatile random access memory (NVRAM), electrically erasable programmable read-only memory (EEPROM), FLASH memory, CD-ROM or other optical disk storage, magnetic disk storage or other magnetic storage devices, or any other computer-readable data storage medium that can be used to carry or store desired program code in the form of instructions or data structures and that can be accessed by a computer/processor.

In summary, in one form, a method is provided comprising: obtaining local call information data sets for each of a plurality of devices engaged in a call, said local call information data sets comprising call attributes and associated metadata; correlating at least one attribute pertaining to the call in each of the local call information data sets to map call signaling of the call; and generating a global end-to-end call state machine subsequent to correlating the at least one attribute, wherein the global end-to-end call state machine includes a plurality of global states, each global state representing a local state of at least one device along with a state transition indicating a change in the local state of the at least one device.

In another form, an apparatus is provided comprising a network interface unit configured to enable network communications; and a processor coupled to the network interface unit, and configured to: obtain, via the network interface, call information data sets for each of a plurality of devices engaged in a call, the call information data sets comprising call attributes and associated metadata; correlate at least one attribute pertaining to the call in each of the local call information data sets to map call signaling of the call; and generate a global end-to-end call state machine subsequent to correlating the at least one attribute, wherein the global end-to-end call state machine includes a plurality of global states, each global state representing a local state of at least one device along with a state transition indicating change in the local state of the at least one device.

In still another form, a non-transitory computer readable medium is provided encoded with computer usable instructions stored thereon for execution by a processor, wherein the instructions, when executed by the processor, cause the processor to: obtain local call information data sets for each of a plurality of devices engaged in a call, the local call information data sets comprising call attributes and associated metadata; correlate at least one attribute pertaining to the call in each of the local call information data sets to map call signaling of the call; and generate a global end-to-end call state machine subsequent to correlating the at least one attribute, wherein the global end-to-end call state machine includes a plurality of global states, each global state representing a local state of at least one device along with state transition indicating change in the local state of the at least one device.

The foregoing detailed description has described only a few of the many possible implementations of the present invention. Thus, the above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a computing device connected to a network, connecting over the network to devices engaged in a call to perform end-to-end call tracing, the call tracing including:
obtaining over the network local call information data sets for each of the devices, said local call information data sets comprising call attributes and associated metadata;
correlating at least one attribute pertaining to the call in each of the local call information data sets to map call signaling of the call, the correlating including:

identifying at least one attribute and associated metadata that includes a same value in at least two of the local call information data sets; and based on the identifying, generating a table that summarizes results of the correlating, the table mapping call signaling across the local call information data sets of the devices;

generating a global end-to-end call state machine based on the correlating, wherein the global end-to-end call state machine includes a plurality of global states, each global state representing a local state of at least one device along with a state transition indicating a change in the local state of the at least one device; and pictorially representing the global end-to-end call state machine as at least one of (i) a ladder diagram pictorially showing each of the devices, messages exchanged between the devices, and lost messages, if any, and/or (ii) a state transition diagram pictorially showing each of the global states in an end-to-end flow of the global states, each global state showing the local states of the devices and state transitions for the local states.

2. The method of claim 1, wherein correlating comprises identifying at least one attribute that includes a same value in at least two of the local call information data sets.

3. The method of claim 1, wherein correlating comprises:
transforming data associated with an attribute in at least one of the local call information data sets to obtain transformed data; and
comparing the transformed data with data associated with another attribute to determine equivalence.

4. The method of claim 1, wherein correlating comprises:
transforming data associated with an attribute of a local call information data set pertaining to a first device to obtain first transformed data;
transforming data associated with an attribute of a local call information data set pertaining to a second device to obtain second transformed data; and
comparing the first transformed data with the second transformed data to determine equivalence.

5. The method of claim 1, wherein the global end-to-end call state machine comprises: at least one message indicative of at least one of a call success or a call failure.

6. The method of claim 1, further comprising determining a status of the call from the at least one of the ladder diagram and/or the state transition diagram.

7. The method of claim 1, wherein, in the state transition diagram, the local states of the devices shown pictorially in the global states are selected from a group of available states including initialization, wait for message, send message, and lost message.

8. The method of claim 1, wherein the generating the table includes generating the table to include a plurality of records each associated with a respective one of the devices engaged in the call, each record including an attribute, metadata associated therewith, and an inter-record attribute-metadata correlation result linking the record to another record in the table to form a chain of records that links the call signaling across the data sets of the devices.

9. An apparatus comprising:
a network interface unit that enables network communications with devices engaged in a call; and
a processor coupled to the network interface unit, and configured to perform end-to-end call tracing, the processor further configured to:

obtain, via the network interface unit, local call information data sets for each of the devices, the local call information data sets comprising call attributes and associated metadata;

correlate at least one attribute pertaining to the call in each of the local call information data sets to map call signaling of the call, wherein the processor is configured to correlate by:
identifying at least one attribute and associated metadata that includes a same value in at least two of the local call information data sets; and
based on the identifying, generating a table that summarizes results of the correlating, the table mapping call signaling across the local call information data sets of the devices;

generate a global end-to-end call state machine based on the correlating, wherein the global end-to-end call state machine includes a plurality of global states, each global state representing a local state of at least one device along with a state transition indicating change in the local state of the at least one device; and pictorially represent the global end-to-end call state machine as at least one of (i) a ladder diagram pictorially showing each of the devices, messages exchanged between the devices, and lost messages, if any, and/or (ii) a state transition diagram pictorially showing each of the global states in an end-to-end flow of the global states, each global state showing the local states of the devices and state transitions for the local states.

10. The apparatus of claim 9, wherein the processor is configured to correlate by identifying that at least one attribute includes the same value in at least two of the local call information data sets.

11. The apparatus of claim 9, wherein the processor is configured to correlate by:
transforming data associated with an attribute in at least one of the local call information data sets to obtain transformed data; and
comparing the transformed data with data associated with another attribute to determine equivalence.

12. The apparatus of claim 9, wherein the processor is configured to correlate by:
transforming data associated with an attribute of a first local call information data set pertaining to a first device to obtain first transformed data;
transforming data associated with an attribute of a second local call information data set pertaining to a second device to obtain second transformed data; and
comparing the first transformed data with the second transformed data to determine equivalence.

13. The apparatus of claim 9, wherein the global end-to-end call state machine comprises: at least one message indicating at least one of a call success or a call failure.

14. The apparatus of claim 9, wherein, in the state transition diagram, the local states of the devices shown pictorially in the global states are selected from a group of available states including initialization, wait for message, send message, and lost message.

15. The apparatus of claim 9, wherein the processor is configured to generate the table to include a plurality of records each associated with a respective one of the devices engaged in the call, each record including an attribute, metadata associated therewith, and an inter-record attribute-metadata correlation result linking the record to another record in the table to form a chain of records that links the call signaling across the data sets of the devices.

16. A non-transitory computer readable medium having computer usable instructions stored thereon for execution by a processor, wherein the instructions, when executed by the processor, cause the processor to connect over a network to devices engaged in a call to perform end-to-end call tracing, the instructions to cause the processor to perform the end-to-end call tracing including instructions to cause the processor to:

obtain over the network local call information data sets for each of a plurality of the devices, the local call information data sets comprising call attributes and associated metadata;

correlate at least one attribute pertaining to the call in each of the local call information data sets to map call signaling of the call by:

identifying at least one attribute and associated metadata that includes a same value in at least two of the local call information data sets; and based on the identifying, generating a table that summarizes results of the correlating, the table mapping call signaling across the local call information data sets of the devices;

generate a global end-to-end call state machine based on the correlating, wherein the global end-to-end call state machine includes a plurality of global states, each global state representing a local state of at least one device along with state transition indicating change in the local state of the at least one device; and pictorially represent the global end-to-end call state machine as at least one of (i) a ladder diagram pictorially showing each of the devices, messages exchanged between the devices, and lost messages, if any, and/or (ii) a state transition diagram pictorially showing each of the global states in an end-to-end flow of the global states, each global state showing the local states of the devices and state transitions for the local states.

17. The non-transitory computer readable medium of claim 16, wherein the instructions cause the processor to correlate by performing at least one of:

transforming data associated with an attribute in at least one of the local call information data sets to obtain transformed data, and comparing the transformed data with data associated with another attribute to determine equivalence, or transforming data associated with an attribute of a first local call information data set pertaining to a first device to obtain first transformed data, transforming data associated with an attribute of a second local call information data set pertaining to a second device to obtain second transformed data, and comparing the first transformed data with the second transformed data to determine equivalence.

18. The non-transitory computer readable medium of claim 16, wherein the global end-to-end call machine comprises at least one message indicative of at least one of a call success or a call failure.

19. The computer readable medium of claim 16, wherein, in the state transition diagram, the local states of the devices shown pictorially in the global states are selected from a group of available states including initialization, wait for message, send message, and lost message.

20. The computer readable medium of claim 16, wherein the instructions that cause the processor to generate the table include instructions to include in the table a plurality of records each associated with a respective one of the devices engaged in the call, each record including an attribute, metadata associated therewith, and an inter-record attribute-metadata correlation result linking the record to another record in the table to form a chain of records that links the call signaling across the data sets of the devices.

* * * * *

UNITED STATES PATENT AND TRADEMARK OFFICE
CERTIFICATE OF CORRECTION

PATENT NO. : 9,491,282 B1
APPLICATION NO. : 14/736598
DATED : November 8, 2016
INVENTOR(S) : Purkayastha et al.

It is certified that error appears in the above-identified patent and that said Letters Patent is hereby corrected as shown below:

In the Claims

Column 15, Line 12, Claim 16 delete "a plurality of".

Signed and Sealed this
Thirteenth Day of March, 2018

Andrei Iancu
*Director of the United States Patent and Trademark Office*